No. 846,539.  
PATENTED MAR. 12, 1907.
F. G. WISELOGEL.  
RENDERING TANK.  
APPLICATION FILED OCT. 8, 1906.
2 SHEETS—SHEET 2.
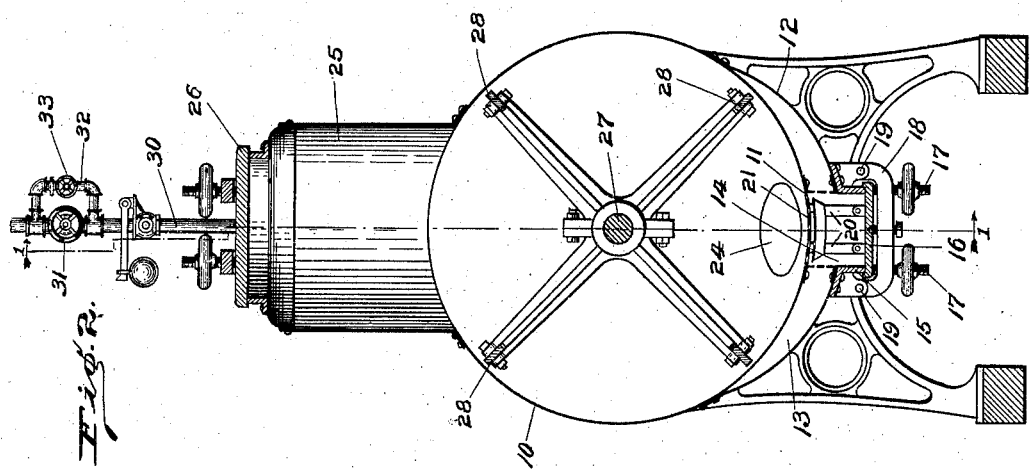
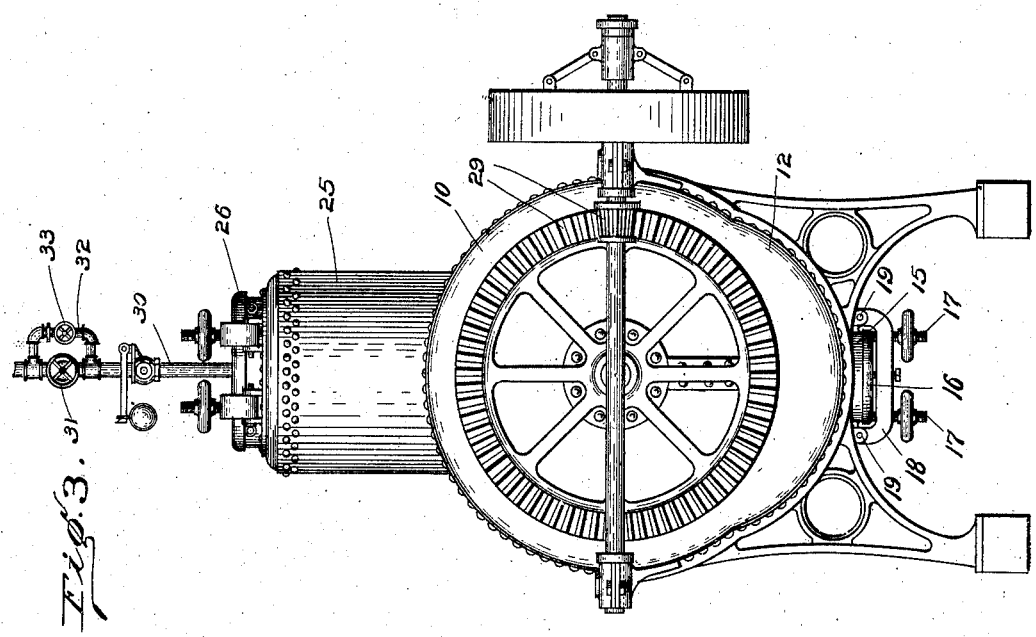
Witnesses  
Frank A. Fahle  
Thomas W. McMeans  
Inventor  
Frederick G. Wiselogel  
By Bradford Hood  
Attorneys

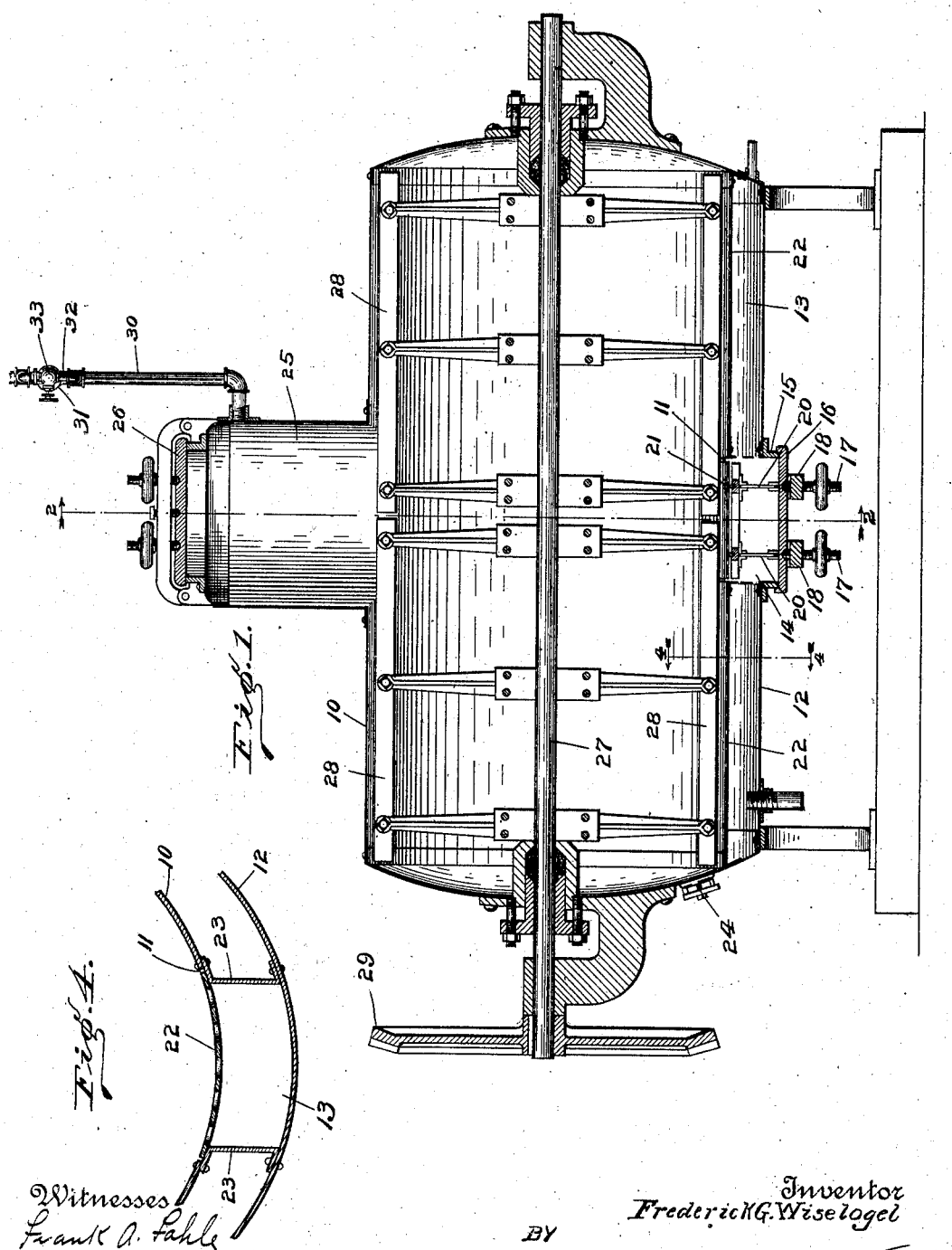

UNITED STATES PATENT OFFICE.

FREDERICK G. WISELOGEL, OF INDIANAPOLIS, INDIANA, ASSIGNOR TO UNITED STATES CONSTRUCTION AND UTILIZATION COMPANY, OF ROCHESTER, NEW YORK, A CORPORATION OF NEW YORK.

RENDERING-TANK.

No. 846,539.     Specification of Letters Patent.     Patented March 12, 1907.

Application filed October 8, 1906. Serial No. 338,066.

*To all whom it may concern:*

Be it known that I, FREDERICK G. WISELOGEL, a citizen of the United States, residing at Indianapolis, in the county of Marion and State of Indiana, have invented certain new and useful Improvements in Rendering-Tanks, of which the following is a specification.

The object of my invention is to provide a tank for extracting grease from garbage and all kinds of animal matter.

The accompanying drawings illustrate my invention.

Figure 1 is a longitudinal vertical section on line 1 1 of Fig. 2. Fig. 2 is a transverse section on line 2 2 of Fig. 1. Fig. 3 is an end elevation, and Fig. 4 a detail on line 4 of Fig. 1.

In the drawings, 10 indicates a cylindrical tank having in its lower side a longitudinal opening 11. Secured to the under side of cylinder 10 is a plate 12, which is of sharper curvature than cylinder 10, so as to form a steam chamber or jacket 13 therebeneath, said chamber extending beneath the opening 11. Steam is supplied to jacket 13 through suitable pipes, as shown in Fig. 1. Plate 12 is provided with a central opening 14, which is surrounded by a flange-casting 15, covered by a cover-plate 16. Plate 16 is supported by a pair of adjusting-screws 17, carried by a transverse arm 18, held in place by a pair of removable pins 19. Connected to cover 16 by suitable links 20 is a perforated plate 21 of a length substantially equal to the opening 14 and of a width substantially equal to the width of slot 11. At the ends of plate 21 slot 11 is bridged by removable perforated plates 22, the edges of which rest upon struts 23, which join the edges of the wall of drum 10 adjacent slot 11 with the underlying plate 12. Drum 10 is also provided with a dome 25, through which material may be introduced, said dome being closed by suitable cover 26. Journaled within drum 10 is a stirrer-shaft 27, provided with stirrer-arms 28, which travel close to the wall of the drum. Shaft 27 is rotated by any suitable means—such, for instance, as gear 29.

Leading from dome 25 is an exhaust-pipe 30, provided with a valve 31, through which a large exhaust may be had when the tank is being first heated. Connecting pipe 30 around valve 31 is a by-pass 32, provided with a small valve 33, through which a small exhaust, sufficient to prevent the steam from becoming dead, may be had during the continued operation, valve 31 being closed.

In operation the material, such as garbage or other matter, is introduced into drum 10 through dome 25, and after all of the various openings are tightly closed steam is admitted into the chamber 13, said steam passing through perforated plates 21 and 22 and mingling with the material as said material is stirred by the paddles 28. The mass is thus thoroughly heated, and the fats pass through the perforated plates 21 and 22 into the chamber 13, from which they may be withdrawn by removing door 16 or through suitable pipes. The mass after being treated is easily withdrawn through manhole 24.

I claim as my invention—

1. In a rendering-tank, the combination, with a receiving-body having a slot in its lower side, and stirring mechanism mounted in the body, of a steam-jacket embracing the lower side of said body under the slot and having an opening in its side opposite the said slot, a cover for said opening, and a removable perforated plate bridging the slot in the main body.

2. In a rendering-tank, the combination, with the receiving-tank and stirring mechanism mounted therein, said tank having a longitudinal slot extending through the bottom of said tank, of a steam-jacket embracing the lower side of said tank and covering said slot, and said jacket having an opening leading thereinto, a cover for said opening, a perforated plate carried by said cover and normally lying in the before-mentioned slot so as to bridge the same, and removable perforated plates bridging said slot at the ends of the perforated plate carried by said cover.

In witness whereof I have hereunto set my hand and seal, at Indianapolis, Indiana, this 20th day of September, A. D. 1906.

FREDERICK G. WISELOGEL. [L. S.]

Witnesses:
  ARTHUR M. HOOD,
  THOMAS W. MCMEANS.